July 3, 1962 G. DALINE 3,042,532
METHOD AND APPARATUS FOR SEASONING FOODS
Filed Oct. 28, 1959

INVENTOR.
GORDON DALINE
BY
John W. Adams

United States Patent Office 3,042,532
Patented July 3, 1962

3,042,532
METHOD AND APPARATUS FOR SEASONING FOODS
Gordon Daline, Excelsior, Minn.
(P.O. Box 572, Tacoma, Wash.)
Filed Oct. 28, 1959, Ser. No. 849,262
10 Claims. (Cl. 99—171)

This invention relates to a method and apparatus for seasoning foods.

It is an object of the present invention to provide a novel yet highly efficient method and apparatus for seasoning foods during the cooking operation.

It is another object to provide a novel and improved method for seasoning foods which includes initially wrapping the food with a perforated sheet having seasoning material stored adjacent the perforations and subsequently cooking the food to cause the seasoning material to pass through the perforations into the food.

It is a further object to provide a method of seasoning foods which also includes wrapping the food with a perforated sheet.

More specifically it is an object to provide such a method including transferring the seasoning material through the perforations into the food when the same is heated during the cooking operation.

It is another object to provide a perforated wrapper for seasoning foods which embodies seasoning material stored adjacent the perforations and including a carrier for the seasoning material to transfer said material through the perforations into the food when the same is heated during the cooking operation.

These and other objects and advantages of this invention will more fully appear from the following description made in connection with the accompanying drawing, wherein like reference characters refer to the same or similar parts throughout the several views, and in which.

Figure 1:
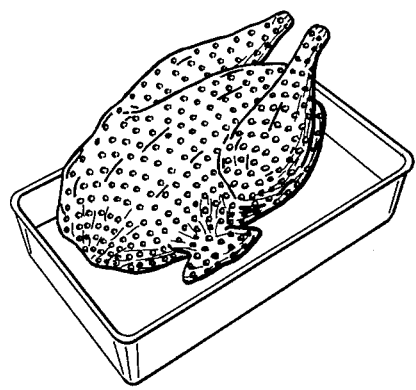
FIG. 1 is a perspective view showing a chicken wrapped with my new wrapper prior to being cooked.
Figure 2:
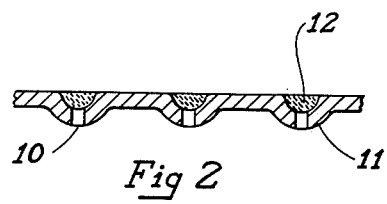
FIG. 2 is a fragmentary sectional view of the wrapper illustrated in FIG. 1.

As illustrated in FIGS. 1 and 2, I provide a perforated wrapper for surrounding food products during the cooking thereof. This wrapper may be perforated as illustrated in FIGS. 1 and 2 wherein each of the perforations is designated by the numeral 10. As best shown in FIG. 2 a recess 11 surrounds the perforation 10 to provide a pocket for receiving and retaining any desired food seasoning material designated by the numeral 12.

Suitable means for carrying or transferring the seasoning material through the perforation into contact with the food product to be seasoned may be provided such as butter or any other desirable material which is relatively solid and stable at ordinary room temperatures but which liquefies at the cooking temperature of the food to be seasoned. In the form of the invention illustrated in FIG. 2 the seasoning is initially mixed with such a carrier agent. Thereafter the mixture is put into each of the recesses to be stored therein until cooking of the food product confined within the wrapper. It is contemplated that in certain instances it will be practical to wrap the food produce before sale to the ultimate consumer but it is also contemplated that the wrapper material may be sold with the seasoning and carrier product in the respective recesses and the food to be seasoned may be wrapped by the cook immediately prior to the cooking operation.

Figure 3:
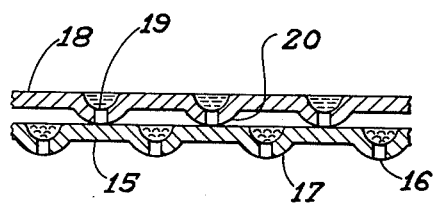
FIG. 3 is a fragmentary sectional view of an alternative form of wrapping.

In the form of the invention illustrated in FIG. 3, two perforated wrappers are provided one being overwrapped about the other. The inner wrapper 15 having perforations 16 with recesses 17 surrounding the perforations is completely enveloped by a second wrapper 18 having perforations 19 and recesses 20. Seasoning material is stored in the recesses 17 of the inner wrapper and a carrier agent such as butter or other suitable transferring material is stored in the recesses of the outer wrapper 18. When the food product is cooked the carrier agent will liquefy and pass through the perforations 19 in the additional wrapper and will contact the seasoning material carried by the recesses of the inner wrapper 15 to carry the same through the perforations 16 and into the food product confined within the double layer wrapper.

In the case of the perforated seasoning wrappers shown in FIGS. 2 and 3 it may be necessary to provide an imperforate outer protective wrapper for surrounding the seasoning wrappers when the same had been applied before purchase by the consumer.

Figure 4:
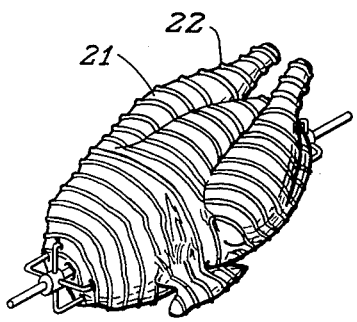
FIG. 4 is a front elevational view of still another form of wrapper.
Figure 5:
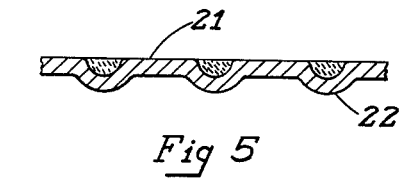
FIG. 5 is a fragmentary sectional view of the form of wrapper shown in FIG. 4; and, FIG. 6 is a fragmentary sectional view showing still another modification of this invention.

As illustrated in FIGS. 4 and 5, I show an imperforate wrapper 21 having a plurality of generally circumferential grooves 22 formed on the inside thereof. These grooves are adapted to be filled with suitable seasoning material before being wrapped about the food product. It will be apparent that there will be little problem involved with this form of the invention in transferring the seasoning material to the food during the cooking operation although the same must, of course, be carried out of the grooves during the cooking and thus provide the desired seasoning for the food. In the form illustrated, the grooves are designed to pass circumferentially around the food so that as the food is being rotated as by a rotisserie a seasoning material may travel around the food to constantly be applied to the surface thereof in a manner similar to that if the same were being constantly basted.

Figure 6:
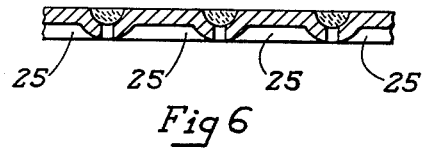

As best shown in FIG. 6 still another modification of my invention is illustrated wherein the recesses provided in the forms of the invention illustrated in FIGS. 2 and 3 may be interconnected by grooves 25 so that the seasoning may be transferred readily from one recess to another during the cooking operation.

It will be seen that I have provided a novel and highly efficient method and apparatus for seasoning food products which includes meats, fish and also bakery products. While I have found that aluminum foil material makes an excellent seasoning wrapper and can be easily formed with the recesses and grooves illustrated in the various forms of my invention, it is of course possible that other materials may be found which are equally adapted for this purpose.

It will, of course, be understood that various changes may be made in the form and details of the specific disclosure herein made without departing from the scope of my invention and which generally stated consists in the matter set forth in the appended claims.

What is claimed is:

1. The method of seasoning foods during the cooking thereof consisting in initially providing a wrapper of normally impervious material provided with a plurality of recesses formed therein, filling said recesses before wrapping the food therein with seasoning material of a type to spread over the surface of the foods being cooked when said wrapper is wrapped therearound, wrapping the food to be cooked with said wrapper sheet containing the seasoning material, and cooking the food with the wrapper and seasoning material therearound to retain a substantial portion of the juices of the food within the wrapper while constantly basting the surface of the food being cooked with the seasoning material carried by the recesses of the wrapper.

2. The method set forth in claim 1, wherein said wrapper of impervious material has a plurality of spaced perforations therein with inwardly indented seasoning retaining pockets formed around each perforation, the perforations permitting the seasoning to pass through the wrapper to constantly baste the surface of the food during the cooking operation.

3. The method set forth in claim 2, and overwrapping said first perforated wrapper with a second perforated wrapper also having seasoning retaining pockets adjacent to each perforation with said perforations and pockets of the second wrapper being out of register with respect to the first wrapper.

4. The method set forth in claim 1 wherein said recesses are formed by inwardly opened outwardly depressed grooves filled with said seasoning material and said wrapper being substantially imperforate with the grooves opening inwardly in free access relation to the outer surface of the food surrounded thereby.

5. Apparatus for seasoning foods during the cooking thereof comprising a wrapper sheet of impervious material having a plurality of pockets formed therein, seasoning material carried by said pockets, and said pockets having an open area affording access between the seasoning material carried thereby and the food surrounded by the wrapper.

6. The structure set forth in claim 5, and said wrapper material being aluminum foil.

7. The structure set forth in claim 5, and said wrapper having a plurality of perforations formed therein with inwardly depressed recess pockets adjacent to each of said perforations for retaining said seasoning material and said perforations forming the access openings through which said seasoning material passes into contact with said food.

8. The structure set forth in claim 7, and a second perforated wrapper similar to the first one and both of said wrappers surrounding the food to be cooked with the perforations of the outer wrapper disposed out of register with respect to the perforations of the inner wrapper.

9. The structure set forth in claim 7 and at least certain of said recess pockets being connected by grooves in said wrapper material.

10. The structure set forth in claim 5 and said pockets being formed by continuous grooves opening inwardly, said wrapper sheet being imperforate and said grooves retaining the seasoning material and juices of the food surrounded by the wrapper during the cooking operation.

References Cited in the file of this patent

UNITED STATES PATENTS

| | | |
|---|---|---|
| 1,581,578 | Kieselback | Apr. 20, 1926 |
| 1,747,596 | Peal | Feb. 18, 1930 |
| 2,277,050 | Reed et al. | Mar. 24, 1942 |
| 2,518,406 | Weber | Aug. 8, 1950 |
| 2,860,990 | Guthrie | Nov. 18, 1958 |
| 2,902,371 | Shorr | Sept. 1, 1959 |

OTHER REFERENCES

"Paper Bag Cookery," 1911, by N. Soyer, published by Sturgis and Walton Company, New York, pages 21 and 29.